United States Patent Office 2,794,474
Patented June 4, 1957

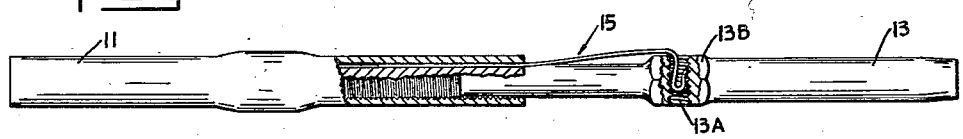
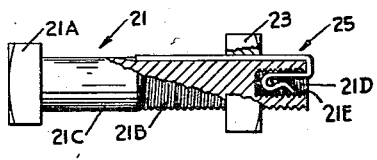
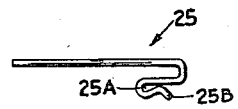
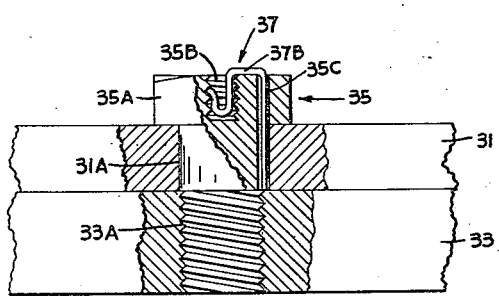
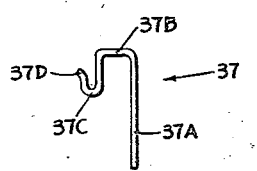

2,794,474

LONGITUDINALLY EXTENDING KEY LOCKING MEANS IN COMBINATION WITH ENGAGED THREADED MEMBERS

Louis C. Stukenborg, Memphis, Tenn.

Application May 18, 1953, Serial No. 355,420

2 Claims. (Cl. 151—8)

This invention relates to a safety lock for rotatable connectors.

More particularly the invention relates to a pin-type safety lock for threadedly connected members wherein the pin passes through alined bores or mating channels in said members, said safety lock being characterized by one of said members having an additional socket and said pin having a portion lockingly engageable therein.

Specifically the invention embodies a pair of threadedly connected members having alinable mating channels or bores, and a pin formed of flexible wire insertable therein to prevent relative rotation between said members, one of said members having an internally threaded or corrugated socket therein and said pin having a hooked end adapted for locking engagement with one or more of the corrugations in said socket.

While the use of resilient or pliant wires, pins or cotter-pins, etc., to lock the members of a threaded connector against relative rotation is broadly old, the prior art does not disclose a simple slip-in wire or pin which is in turn provided with an extension for locking itself against displacement from its functional relationship to the locked connector members.

It is a principal object of this invention to provide a pin-type safety lock for threaded connector members, which lock is in turn provided with slip-in locking means for preventing its own displacement.

It is another object to provide a lock pin having a barb-like detent on its free end for locking engagement in a socket in one of a pair of threadedly connected members locked against relative rotation thereby.

It is a further object of the invention to provide a lock pin formed of spring wire and having a barb-like detent on its free end for locking the same in an internally threaded or corrugated bore in one of a pair of threadedly connected members locked against rotation by the working end of said pin.

It is the overall object of the invention to generally improve the design and efficiency of pin-type safety locks for threaded connectors.

The means by which the foregoing and other objects of the present invention are accomplished and the manner of their accomplishment will be readily understood from the following specification upon reference to the accompanying drawings, in which:

Fig. 1 is a fragmentary elevational view, partly in longitudinal axial section, of a telescopic threaded rod-connection of the turn buckle and rod type embodying a preferred form of the invention.

Fig. 2 is an elevational view of the spring pin per se of Fig. 1.

Fig. 3 is an elevational view, partly in axial section, of a bolt and nut embodying a modified form of the invention.

Fig. 4 is an elevational view of the spring pin of Fig. 3.

Fig. 5 is an elevation partly in axial section of a further modification, in which the invention is applied to a cap screw.

Fig. 6 is an elevational view of the spring pin per se of Fig. 5.

Referring now to Figs. 1 and 2 of the drawings, the numeral 11 designates the female element and numeral 13 the male element of a telescopic threaded rod joint. Female element 11 is shown as an internally threaded turn-buckle barrel and male element 13 is shown as an externally threaded rod end engaging the barrel for length-adjustable relative-rotational interengagement.

The telescopic elements 11 and 13 are provided with one or more pairs of mating, shallow, keyway-like, longitudinally extending grooves through the threads to form one or more passages into which the key-like pin 15 can be inserted to lock the telescopic members 11 and 13 against rotation from their desired telescopic adjustment. Pin 15 can be formed of any suitable material, but is preferably made of spring-steel wire or its equivalent. The key end 15A of pin 15 is relatively straight and may have its end rounded to facilitate its insertion into the passageway formed by the mating key-way-like grooves in the elements 11 and 13.

The free or handle section of pin 15 is bent angularly to the body of the pin and the angularly bent portion is sharply reversely bent to form a resilient, blunt-ended loop 15B for insertion into a transversely extending bore 13A in enlarged portion 13B of the male element 13. The end of loop 15B is flared outwardly to form a detent-forming finger 15C. Finger 15C engages into pockets or depressions in the walls of bore 13A. Said pockets or depressions may be formed in any desired manner but may very conveniently be formed by top-threading the bore. While it is preferred that the bore 13A have a threaded or corrugated surface, the same may be merely left or made sufficiently rough to produce either a frictional or detent-like positive holding of the loop 15B and its barb-like finger 15C.

In use, the elements 11 and 13 are screwed together to the desired length or amount of telescopic coupling, but with the elements set to cause the mating grooves to aline to form the pin-receiving passageway. Then the key end 15A of pin 15 is inserted into the key-like passageway so formed, to lock elements 11 and 13 against relative rotation. Next pin 15 is inserted a distance sufficient to bring loop 15B to a point opposite bore 13A. Lastly, loop 15B is inserted into bore 13A until detent 15C engages into one of the thread-formed depressions to lock the loop 15B and thereby the pin 15 in safety-locking position relative to the elements 11 and 13, the resilience of the loop permitting detent 15C to ride past the corrugations during insertion but causing the tip of the detent to be urged outwardly into engagement with at least one of the corrugations effecting the desired locking.

In the modification of Figs. 3 and 4, the numeral 21 generally designates a bolt or screw having a head 21A and threads 21B cut into its shank portion 21C. A nut 23 (or similar threaded member, such as a plate having a tapped bore therein) is adapted to receive or to be screwed onto said bolt 21. The bolt 21 and the nut 23 have one or more pairs of matching key-way-like grooves cut through their threaded portions and lying substantially parallel to the axis of bolt 21. The mating grooves, which are of approximately equal depth in both of bolt 21 and nut 23 form a passageway to receive a pin 25 similar to pin 15 for locking said elements against relative rotation.

Pin 25 is relatively straight for most of its length and is preferably formed of spring-steel wire or equivalent material. Pin 25 is angularly bent at one end and the bent portion is reversely bent to form a loop 25A adapted for insertion into an anchorage bore 21D in the end of bolt 21. The end of the pin or wire forming the loop 25A is then outwardly curved or flared to form a barb-like detent 25B. Detent 25B engages into depressions or corrugations 21E formed in the walls of bore 21D. These depressions or corrugations 21E may be conveniently formed by internally threading the bore 21D, or by otherwise roughening, or making undulated, the surface of the bore.

In use, bolt 21 and nut 23 are screwed together to the desired relative positions, but with a pair of key-way-forming grooves in the two elements alined to define a passageway to receive the key-forming pin 25. Pin 25 is then inserted into said passageway to a distance permitting the loop 25A to enter the anchorage bore 21D to a depth sufficient to cause the detent tip 25B of the wire to engage into one of the grooves formed in the bore 21D by the threads cut into the walls thereof. By this single simple motion the bolt and nut are locked together and the locking pin is safely locked against unlocking displacement from its locking position relative to said elements, in manner similar to the locking of pin 15 previously described.

In the modification of Figs. 5 and 6, a pair of elements or plates 31 and 33 are fastened together by a machine cap screw 35 passing through an aperture 31A in plate 31 and screwed ino a threaded bore 33A in plate 33. Screw 35 has an enlarged head 35A, provided with a relatively large centrally located threaded axial bore 35B and a peripherally located smaller bore 35C parallel to the axis of screw 35 and radially outside the cylinder defined by the surface of the shank of the screw 35.

Bore 35C is adapted to receive the key portion 37A of pin 37, which is similar to the pins previously described and is preferably formed of spring steel wire or equivalent material. Pin 37 extends downwardly through bore 35C in the head 35A and enters a bore 31A in plate 31 alined therewith to lock screw 35 against rotation relative to plate 31. Pin 37 has a laterally extending section 37B, the end of which is downwardly bent to form a loop portion 37C for entrance into the threaded central bore 35C. The loop portion 37C terminates in a barb-like detent 37D by which the pin is anchored in screw-locking position relative to the latter and to plate 31. The method of insertion of pin 37 is very similar to that of inserting the pin 31 previously described.

While the pins 15, 25 and 37 have been disclosed as being formed of round spring-steel wire, it is obvious that other materials metallic or non-metallic, resilient or non-resilient (but deformable), and of non-circular, flattened, or other cross-sectional configuration, could also be employed if and as desired.

I claim:

1. In combination, male and female members rotatably engaged, said members each being provided with a longitudinal groove, said grooves being in register, a shallow socket having an open outer end formed axially of said male member, said socket internally being corrugated, a bore formed in said male member parallel to and eccentrically disposed relative to said socket and alined with the groove in said male member, a wire-like key portion extending through said bore and lying in said registered grooves to prevent relative rotation between said members, an offset section integrally connected to one end of and offset from said key portion and engaging said male member adjacent said socket, a reversely bent anchor carried by said section and including a rounded bight within said socket and substantially abutting diametrically opposed portions of said socket, said anchor terminating in a detent curved away from said offset section and having a free end engaging said socket corrugations intermediate the depth of said socket and spaced inwardly of said socket from the outer end of said socket.

2. In combination, male and female members rotatably engaged, said members each being provided with a longitudinal groove, said grooves being in register, a shallow socket having an open outer end formed axially of said male member, said socket internally being corrugated, a bore formed in said male member parallel to and eccentrically disposed relative to said socket and alined with the groove in said male member, a wire-like key portion extending through said bore and lying in said registered grooves to prevent relative rotation between said members, an offset section integrally connected to one end of and offset from said key portion and engaging said male member adjacent said socket, a reversely bent anchor carried by said section and including a rounded bight within said socket and substantially abutting diametrically opposed portions of said socket, said anchor terminating in a detent curved away from said offset section and having a free end engaging said socket corrugations intermediate the depth of said socket and spaced inwardly of said socket from the outer end of said socket, said anchor portion between said bight and said free end converging towards said offset section whereby to limit movement of said free end toward said offset portion and away from the corrugations of said socket.

References Cited in the file of this patent

UNITED STATES PATENTS

| | | |
|---|---|---|
| 227,775 | Hemp | May 18, 1880 |
| 238,340 | Bunker | Mar. 1, 1881 |
| 526,697 | Franklin et al. | Oct. 2, 1894 |
| 552,159 | Weaver | Dec. 31, 1895 |
| 589,545 | Comra | Sept. 7, 1897 |
| 854,800 | Cheek | May 28, 1907 |
| 859,789 | Vaughn | July 9, 1907 |
| 1,061,060 | Ford | May 6, 1913 |
| 1,576,062 | Passmore | Mar. 9, 1926 |
| 1,616,286 | Stimpson | Feb. 1, 1927 |
| 2,564,550 | Tichenor | Aug. 14, 1951 |
| 2,580,482 | Stukenborg et al. | Jan. 1, 1952 |

FOREIGN PATENTS

| | | |
|---|---|---|
| 178,763 | Great Britain | May 22, 1922 |
| 350,192 | Great Britain | June 11, 1931 |